US009519605B2

(12) United States Patent
Arimilli et al.

(10) Patent No.: US 9,519,605 B2
(45) Date of Patent: Dec. 13, 2016

(54) INTERCONNECTION NETWORK TOPOLOGY FOR LARGE SCALE HIGH PERFORMANCE COMPUTING (HPC) SYSTEMS

(71) Applicant: INTERNATIONAL BUSINESS MACHINES CORPORATION, Armonk, NY (US)

(72) Inventors: Baba L. Arimilli, Austin, TX (US); Wolfgang Denzel, Langnau am Albis (CH); Philip Heidelberger, Cortlandt Manor, NY (US); German Rodriguez Herrera, Adliswil (CH); Christopher J. Johnson, Rochester, MN (US); Lonny Lambrecht, Byron, MN (US); Cyriel Minkenberg, Gutenswil (CH); Bogdan Prisacari, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/326,208

(22) Filed: Jul. 8, 2014

(65) Prior Publication Data

US 2016/0012004 A1    Jan. 14, 2016

(51) Int. Cl.
*G06F 13/00* (2006.01)
*G06F 13/40* (2006.01)
*G06F 13/42* (2006.01)

(52) U.S. Cl.
CPC ....... *G06F 13/4022* (2013.01); *G06F 13/4027* (2013.01); *G06F 13/4036* (2013.01); *G06F 13/4221* (2013.01)

(58) Field of Classification Search
CPC .................. G06F 13/4027; G06F 13/4221
See application file for complete search history.

(56) References Cited

U.S. PATENT DOCUMENTS

| 8,489,718 | B1 * | 7/2013 | Brar | ............... H04L 49/356 370/254 |
| 2003/0088696 | A1 | 5/2003 | McCanne | |

(Continued)

OTHER PUBLICATIONS

Jiang, Nan et al., "Indirect Adaptive Routing on Large Scale Interconnection Networks", ISCA'09, Austin, Texas, USA Copyright 2009 ACM, Jun. 20-24, 2009.

(Continued)

*Primary Examiner* — Zachary K Huson
(74) *Attorney, Agent, or Firm* — Brian F. Russell; Steven L. Bennett

(57) ABSTRACT

A multiprocessor computer system includes a plurality of processor nodes and at least a three-tier hierarchical network interconnecting the processor nodes. The hierarchical network includes a plurality of routers interconnected such that each router is connected to a subset of the plurality of processor nodes; the plurality of routers are arranged in a hierarchy of $n \geq 3$ tiers $(T_1, \ldots, T_n)$; the plurality of routers are partitioned into disjoint groups at the first tier $T_1$, the groups at tier $T_i$ being partitioned into disjoint groups (of complete $T_i$ groups) at the next tier $T_{i+1}$ and a top tier $T_n$ including a single group containing all of the plurality of routers; and for all tiers $1 \leq i \leq n$, each tier-$T_{i-1}$ subgroup within a tier $T_i$ group is connected by at least one link to all other tier-$T_{i-1}$ subgroups within the same tier $T_i$ group.

10 Claims, 12 Drawing Sheets

(56) References Cited

U.S. PATENT DOCUMENTS

| | | |
|---|---|---|
| 2009/0106529 A1 | 4/2009 | Abts et al. |
| 2010/0049942 A1 | 2/2010 | Kim et al. |
| 2012/0020242 A1 | 1/2012 | McLaren et al. |
| 2012/0072614 A1 | 3/2012 | Marr et al. |
| 2012/0144064 A1* | 6/2012 | Parker .................... H04L 45/04 709/241 |
| 2012/0144065 A1 | 6/2012 | Parker et al. |

OTHER PUBLICATIONS

Kim, John et al.,"Cost-Efficient Dragonfly Topology for Large-Scale Systems", Published by the IEEE Computer Society 2009 IEEE, Feb. 1, 2009.

Faanes, Greg et al., "Cray Cascade: a Scalable HPC System based on a Dragonfly Network", Salt Lake City, Utah, USA © 2012 IEEE, Nov. 10-16, 2012.

Garcia, M.,"Global Misrouting Policies in Two-level Hierarchical Networks", INA-OCMC '13, Berlin, Germany. Copyright 2013 ACM, Jan. 23, 2013.

Kim, John et al., "Technology-Driven, Highly-Scalable Dragonfly Topology", International Symposium on Computer Architecture 2008 IEEE.

Abts, Dennis et al., "The Cray BlackWidow: A Highly Scalable Vector Multiprocessor",Reno, Nevada, USA ISBN, Nov. 10-16, 2007.

Scott, Steve et al.,"The BlackWidow High-Radix Clos Network", Proceedings of the 33rd International Symposium on Computer Architecture © 2006 IEEE.

Arimilli et al. "Improved Interconnection Network Topology for Large Scale High Performance Computing (HPC) Systems", Filing Date: Sep. 15, 2014, U.S. Appl. No. 14/486,719 Non-Final Office Action dated Aug. 15, 2016.

* cited by examiner

TABLE I. NUMBER OF HOPS PER TIER IN $GDF(p; h_1, h_2)$

| length | hops | #paths | $l_1$ hops | $l_2$ hops |
|---|---|---|---|---|
| 0 | – | 1 | 0 | 0 |
| 1 | $l_1$ | $h_1$ | $h_1$ | 0 |
| 1 | $l_2$ | $h_2$ | 0 | $h_2$ |
| 2 | $l_1 l_2$ | $h_1 h_2$ | $h_1 h_2$ | $h_1 h_2$ |
| 2 | $l_2 l_1$ | $h_1 h_2$ | $h_1 h_2$ | $h_1 h_2$ |
| 3 | $l_1 l_2 l_1$ | $h_1^2 h_2$ | $2h_1^2 h_2$ | $h_1^2 h_2$ |

*Figure 3*

TABLE II. ANALYSIS OF NUMBER OF HOPS AT EACH TIER IN GDF($g; h_1, h_2, h_3$).

*Figure 4*

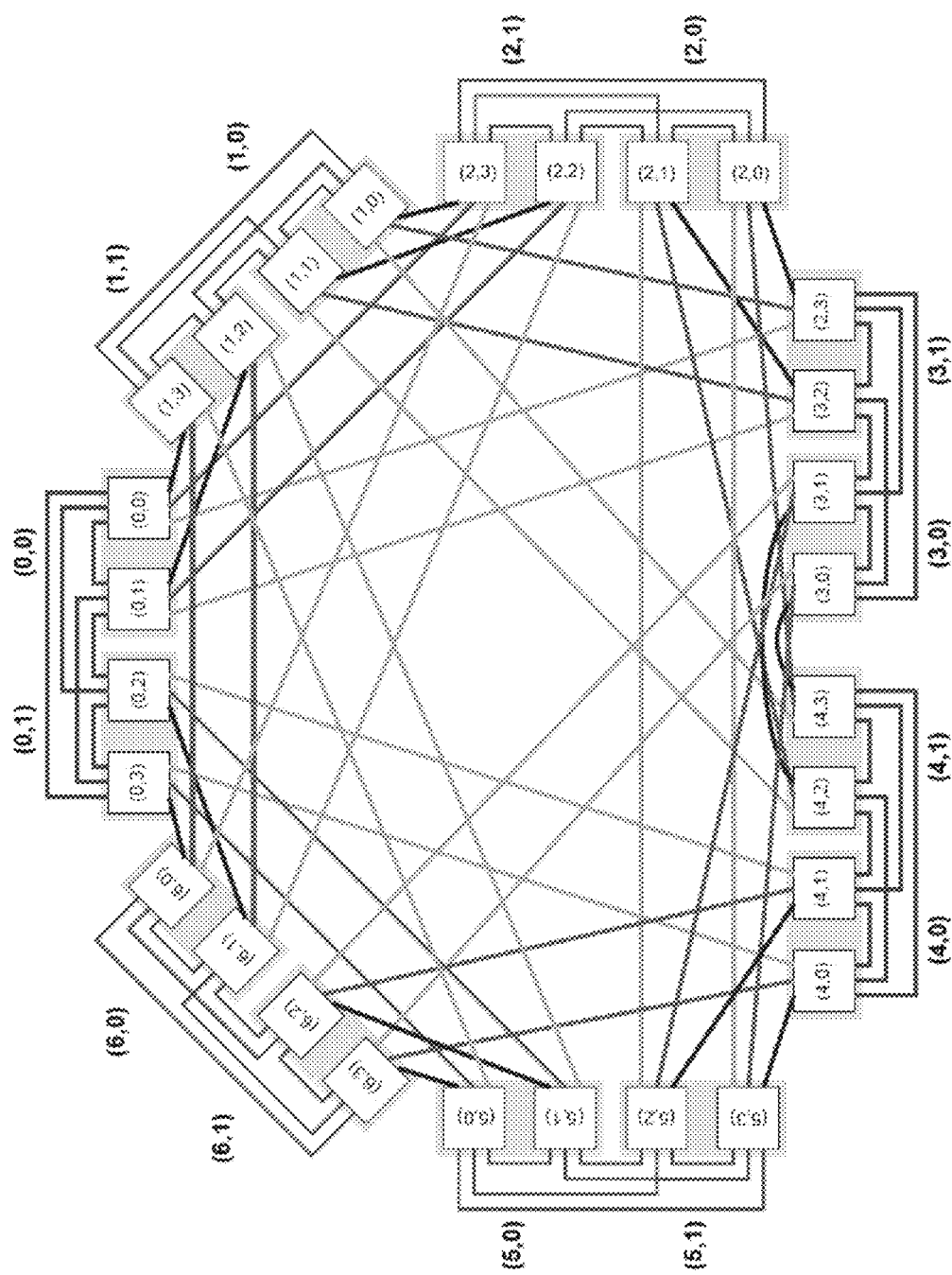
Figure 7: EGDF($p$;3,3;1,2).

TABLE III. ANALYSIS OF NUMBER OF HOPS AT EACH TIER IN $XGDF(p; h_1, h_2; b_1, b_2)$.

| length | hops | #paths | $l_1$ hops | $l_2$ hops |
|---|---|---|---|---|
| 0 | - | 1 | 0 | 0 |
| 1 | $l_1$ | $\frac{h_1}{b_1}$ | $\frac{h_1}{b_1}$ | 0 |
| 1 | $l_2$ | $h_2$ | 0 | $h_2$ |
| 2 | $l_1 l_2$ | $\frac{h_1 h_2}{b_1}$ | $\frac{h_1 h_2}{b_1}$ | $\frac{h_1 h_2}{b_1}$ |
| 2 | $l_2 l_1$ | $\frac{x h_2}{b_2}$ | $x h_2$ | $\frac{x h_2}{b_2}$ |
| 3 | $l_1 l_2 l_1$ | $\frac{x^2 h_2}{b_2}$ | $2 x^2 \frac{h_2}{b_2}$ | $x^2 \frac{h_2}{b_2}$ |

*Figure 8*

TABLE IV.  BALANCED THREE-TIER XGDF NETWORKS WITH $h_3 = 2$

| $N$ | XGDF spec | $B_{1,2}$ | $B_{2,3}$ | $p_{max}$ |
|---|---|---|---|---|
| 27 | 1; 2, 2; 2, 1, 3, 9 | 1.00 | 1.00 | 3.04 |
| 108 | 1; 3, 2; 2, 1, 4, 3 | 1.08 | 0.97 | 1.81 |
| 180 | 1; 3, 3; 2, 1, 3, 5 | 1.02 | 1.10 | 2.24 |
| 272 | 1; 3, 3; 2, 1, 4, 2 | 1.08 | 1.01 | 1.90 |
| 342 | 1; 5, 3; 2, 1, 1, 14 | 0.97 | 1.06 | 3.00 |
| 480 | 1; 4, 3; 2, 1, 3, 4 | 1.06 | 1.02 | 2.05 |
| 528 | 1; 3, 3; 2, 1, 4, 1 | 1.00 | 0.98 | 1.63 |
| 630 | 1; 4, 3; 2, 1, 3, 3 | 1.06 | 1.02 | 1.99 |
| 780 | 1; 5, 3; 2, 1, 2, 10 | 1.08 | 0.98 | 2.14 |
| 8,976 | 1; 7, 4; 2, 1, 1, 16 | 0.98 | 1.08 | 2.07 |
| 9,384 | 1; 7, 4; 2, 1, 2, 4 | 1.06 | 1.10 | 1.99 |
| 11,130 | 1; 7, 4; 2, 1, 2, 2 | 0.96 | 1.09 | 1.99 |
| 11,880 | 1; 6, 4; 2, 1, 2, 1 | 0.99 | 1.09 | 2.05 |
| 12,936 | 1; 7, 4; 2, 1, 1, 12 | 0.99 | 1.08 | 2.05 |
| 17,688 | 1; 7, 4; 2, 1, 1, 11 | 0.99 | 1.08 | 2.05 |
| 18,632 | 1; 7, 4; 2, 1, 1, 8 | 0.97 | 1.06 | 2.02 |
| 22,155 | 1; 7, 4; 2, 1, 2, 9 | 1.09 | 1.07 | 2.03 |
| 35,112 | 1; 6, 4; 2, 1, 2, 1 | 0.98 | 1.07 | 2.01 |
| 37,296 | 1; 7, 4; 2, 1, 1, 4 | 0.97 | 1.05 | 2.06 |
| 46,728 | 1; 8, 4; 2, 1, 1, 6 | 1.08 | 1.05 | 2.04 |
| 69,960 | 1; 7, 4; 2, 1, 1, 3 | 0.98 | 1.04 | 2.00 |
| 111,222 | 1; 8, 4; 2, 1, 1, 2 | 1.10 | 1.03 | 2.06 |
| 139,656 | 1; 7, 4; 2, 1, 1, 1 | 0.98 | 1.03 | 2.00 |

*Figure 9*

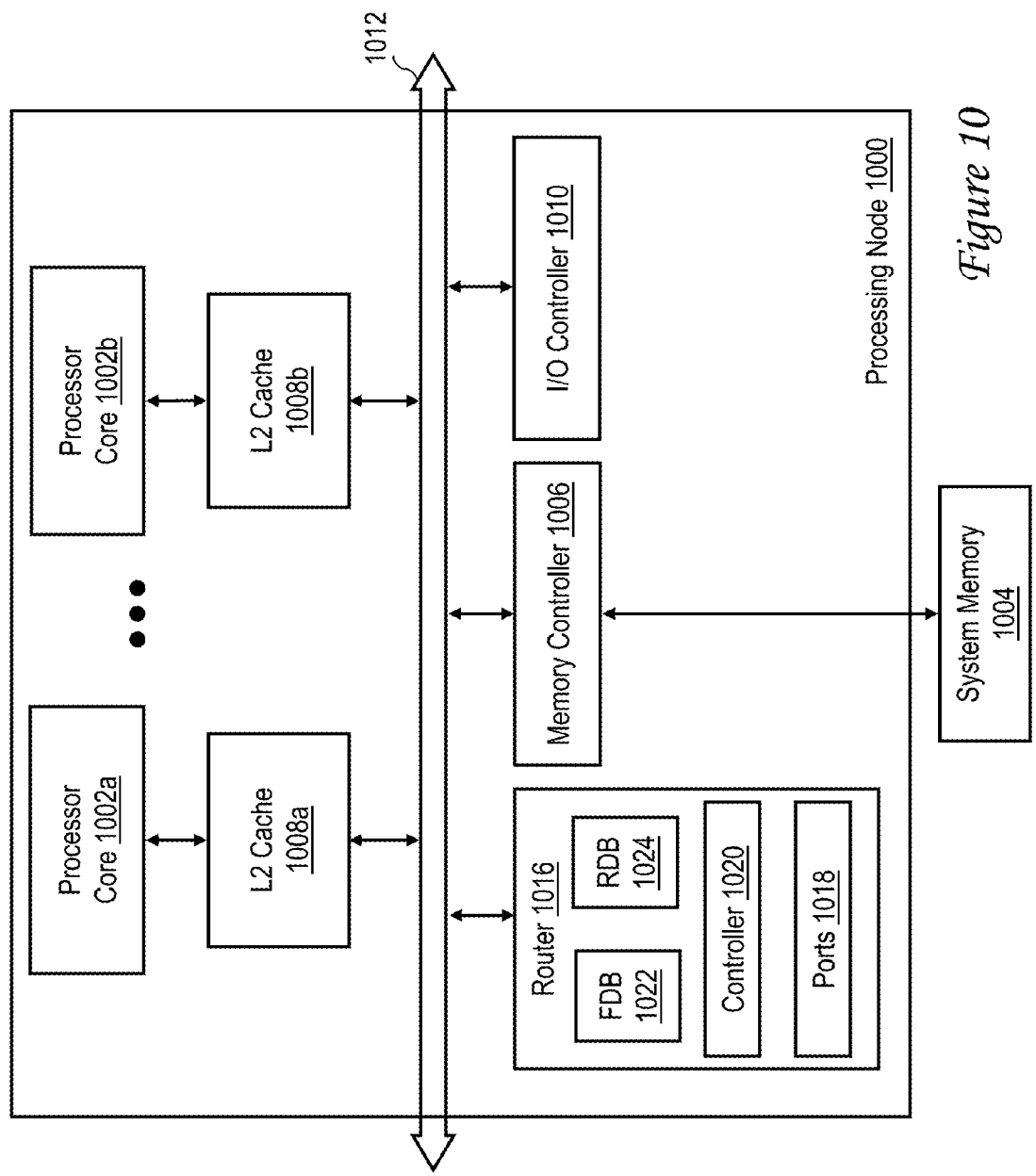

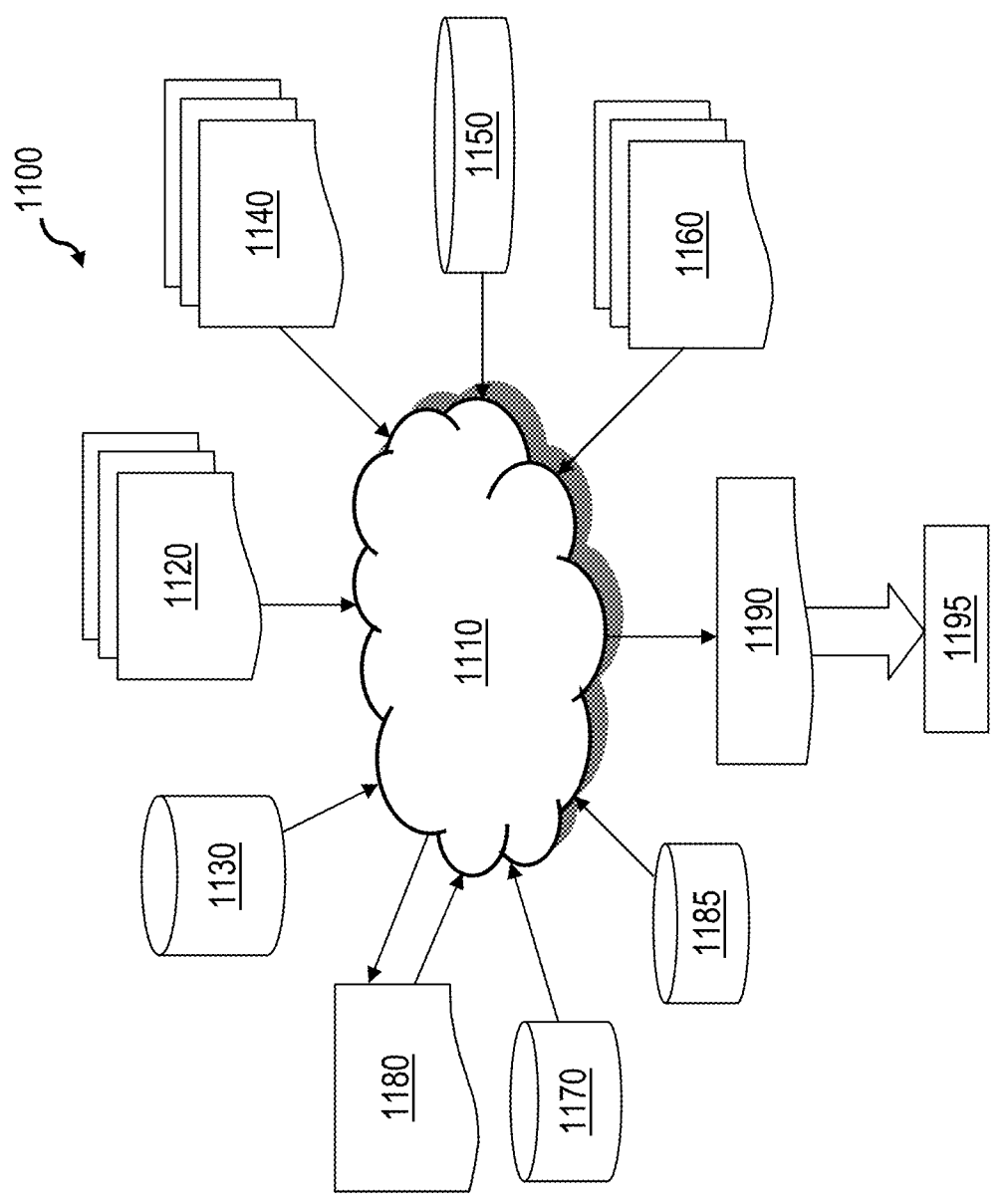

US 9,519,605 B2

INTERCONNECTION NETWORK TOPOLOGY FOR LARGE SCALE HIGH PERFORMANCE COMPUTING (HPC) SYSTEMS

BACKGROUND OF THE INVENTION

The present invention relates generally to data processing and, in particular, to an improved interconnection network topology for large scale, high performance computing (HPC) systems.

Scalable, cost-effective, and high performance interconnection networks are a prerequisite for large scale HPC systems. The dragonfly topology, described, for example, in US 2010/0049942, is a two-tier hierarchical interconnection network topology. At the first tier, a number of routers are connected in a group to form a large virtual router, with each router providing one or more ports to connect to other groups. At the second tier, multiple such groups of routers are connected such that the groups form a complete graph (full mesh), with each group having at least one link to every other group.

The main motivation for a dragonfly topology is that a dragonfly topology effectively leverages large-radix routers to create a topology that scales to very high node counts with a low diameter of just three hops, while providing high bisection bandwidth. Moreover, the dragonfly minimizes the number of expensive long optical links, which provides a clear cost advantage over fat tree topologies, which require more long links to scale to similar-size networks.

However, when considering exascale systems, fat tree and two-tier dragonfly topologies run into scaling limits. Assuming a per-node peak compute capacity $R_n = 10$ TFLOP/s, an exascale system would require $N = 100{,}000$ nodes. A non-blocking fat tree network with N end nodes built from routers with r ports requires $n = 1 + \log(N/r)/\log(r/2)$ levels (with N rounded up to the next integer); therefore, using current Infiniband routers with $r = 36$ ports, this system scale requires a network with $n = 4$ levels, which amounts to $2n - 1 = 7$ router ports per end node and $(2n-1)/r = 0.19$ routers per end node. To achieve this scale in just three levels, routers with a radix $r = 74$ are needed, which corresponds to 0.068 routers per node.

A balanced—i.e., providing a theoretical throughput bound of 100% under uniform traffic-two-tier dragonfly network $(p, a, h) = (12, 26, 12)$ can also scale to about 100,000 nodes, where p is "bristling factor" indicating the number of terminals connected to each router, a is the number of routers in each group, and h is the number of channels in each router used to connect to other groups. This corresponds to $1/12 = 0.083$ routers per node and $49/12 = 4.1$ ports per node, which is significantly more cost-effective than the four-level fat tree, and about on par with the three-level fat tree, which requires much larger routers.

BRIEF SUMMARY

The present disclosure appreciates that as HPC systems scale to ever increasing node counts, integrating the router on the CPU chip would improve total system cost, density, and power, which are all important aspects of HPC systems. However, this next step in CPU integration reverses the industry trend, in the sense that the practical radix of such on-chip routers is much smaller than what has been previously predicted in the art. Consequently, it would be useful and desirable to deploy direct interconnection networks, such as dragonfly networks, that scale to high node counts and arbitrary numbers of tiers, while reducing router radices to a level that supports commercially practical integration of the routers into the CPU chips.

In at least some embodiments, a multiprocessor computer system includes a plurality of processor nodes and at least a three-tier hierarchical network interconnecting the processor nodes. The hierarchical network includes a plurality of routers interconnected such that each router is connected to a subset of the plurality of processor nodes; the plurality of routers are arranged in a hierarchy of $n > 3$ tiers $(T_1, \ldots, T_n)$; the plurality of routers are partitioned into disjoint groups at the first tier $T_1$, the groups at tier $T_i$ being partitioned into disjoint groups (of complete $T_i$ groups) at the next tier $T_{i+1}$ and a top tier $T_i$ including a single group containing all of the plurality of routers; and for all tiers $1 \le i \le n$, each tier-$T_{i-1}$ subgroup within a tier $T_i$ group is connected by at least one link to all other tier-$T_{i-1}$ subgroups within the same tier $T_i$ group.

BRIEF DESCRIPTION OF THE SEVERAL VIEWS OF THE DRAWINGS

FIG. 3 provides a table listing the number of hops per tier in a two-tier dragonfly topology;

FIG. 4 provides a table listing the number of hops at each tier in a three-tier GDF topology;

FIG. 7 illustrates an example of an extended GDF (XGDF) topology with a bundling factor of two;

FIG. 8 provides a table summarizing the number of hops at each tier of an XDGF topology;

FIG. 9 provides a table summarizing nearly balanced three-tier XGDF topologies;

FIG. 10 depicts a block diagram of an exemplary processing node that, in accordance with a preferred embodiment, includes an integrated router; and FIG. 11 illustrates an exemplary design flow that may be applied to a processing node having an integrated router.

DETAILED DESCRIPTION

As noted above, dragonfly topologies are highly scalable direct networks with a good cost-performance ratio and are one of the principal options for future exascale machines. Dragonfly networks are hierarchical networks, and in principle, at each level of the hierarchy, a different connection pattern could be chosen. Most prior art dragonfly networks have adopted the fully connected mesh at each level of the hierarchy, but others have employed alternative connectivity patterns, such as a flattened butterfly. Connection patterns other than the fully-connected mesh increase scalability at the cost of longer shortest paths and/or an increased number of virtual channels required to avoid deadlock.

Figure 1:
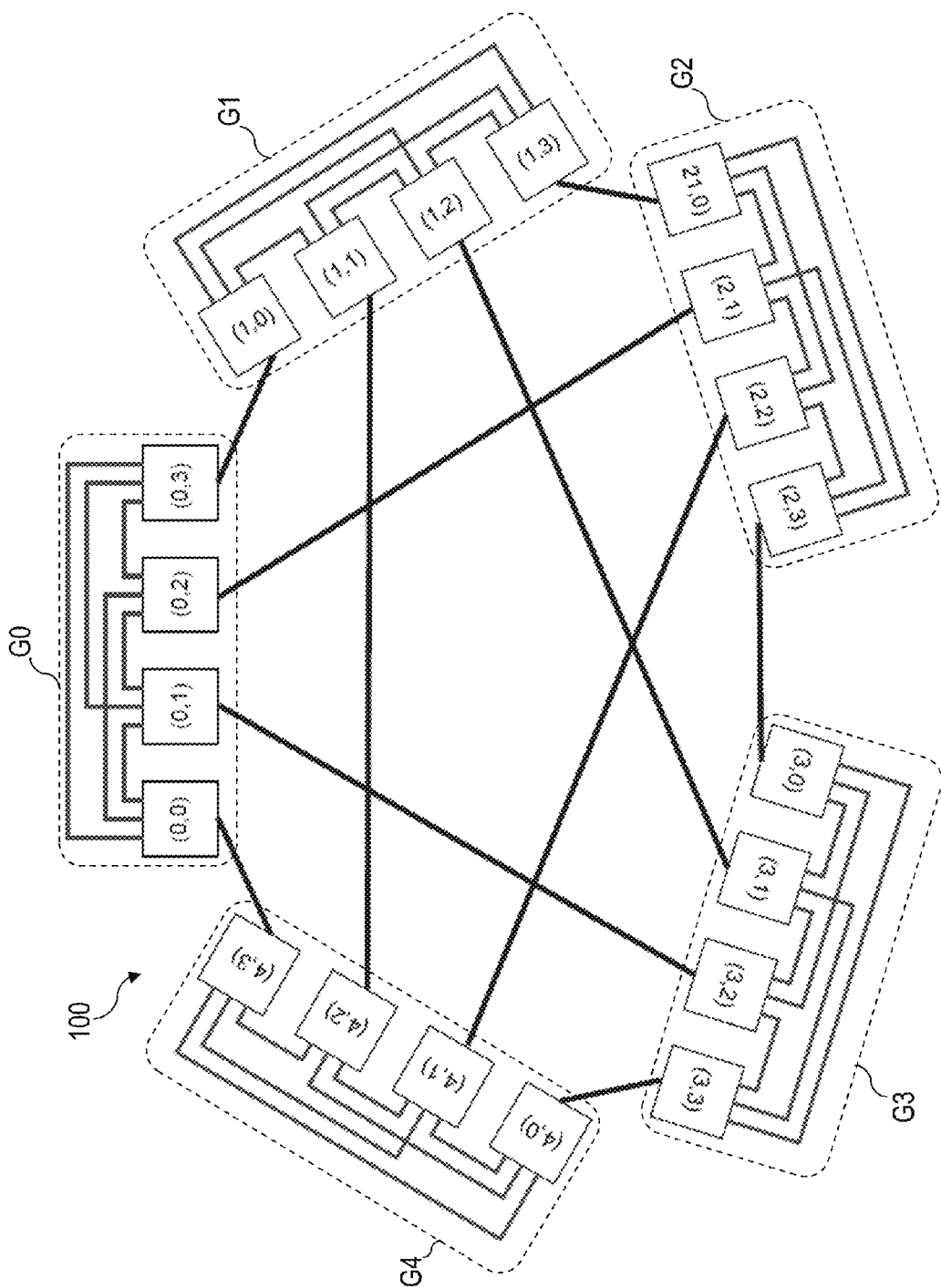
FIG. 1 illustrates a conventional interconnection network having a two-tier dragonfly network topology.

With reference now to FIG. 1, an example of a conventional interconnection network 100 employing a two-tier dragonfly topology is illustrated. In the prior art, a dragonfly network is fully specified by three parameters: p, the bristling factor indicating the number of processing nodes (terminals) per router, a, the number of routers per group, and h, the number of ports per router to connect to other groups. As there are a routers per group and each router has h ports to connect to other groups, there are G=ah+1 groups, S=a(ah+1) routers, and N=pa(ah+1) end nodes. For the purpose of generalizing the dragonfly topology to more than the two tiers disclosed by the prior art, the conventional dragonfly topology notation can be extended to specify the number of peer ports per router as follows: DF(p, $h_1$, $h_2$), where $h_1$=a−1 and $h_2$=h, such that G=($h_1$+1)$h_2$+1 and S=($h_1$+1)(($h_1$+1)$h_2$+1). Thus, employing this new notation, the interconnection network 100 can be specified as DF(p, 3, 1), which has G=5 groups (designated G0-G4) and S=20 routers, each designated by a duple including the group number and router number. (FIG. 1 omits illustration of the separate processing nodes coupled to each router to avoid obscuring the topology.)

In accordance with the present disclosure, the prior art dragonfly topology can be generalized to an arbitrary number of tiers n. Using the enhanced notation introduced supra, a generalized dragonfly (GDF) topology is specified by GDF(p; $\bar{h}$), where p again serves as the bristling factor and $\bar{h}$ is a vector h=($h_1$, ..., $h_n$) representing the number of peer ports per router for each tier. To provide scaling at each tier, for each i between 1 and n inclusive, $h_i$ is preferably greater than or equal to 1.

$G_i$ is further defined as the number of tier i−1 groups that constitute a fully connected topology at tier i. For convenience, $G_0$ can be utilized to indicate the individual routers, which can each be considered as "groups" at tier 0:

$$G_0 = 1$$
$$G_1 = h_1 + 1$$
$$G_2 = G_1 \cdot h_2 + 1$$
$$G_3 = G_1 \cdot G_2 \cdot h_3 + 1$$
...
$$G_n = \left(\prod_{j=0}^{n-1} G_j\right) \cdot h_n + 1$$

The total number of routers and nodes scales very rapidly as a function of the parameters $h_i$, as the total number of routers $S_i$ at tier i is given by the product of the group sizes up to and including tier i:

$$S_i = \left(\prod_{j=1}^{i} G_j\right),$$

where the total number of routers equals $S_n$ and the total number of nodes N equals $pS_n$.

Each router in the topology can be uniquely identified by an n-value coordinate vector $\bar{g}$=($g_n$, $g_{n-1}$, •, $g_i$, •, $g_1$), with $0 \le g_i \le G_i$, with each coordinate indicating the relative group position at each tier of the hierarchy.

Figure 2:
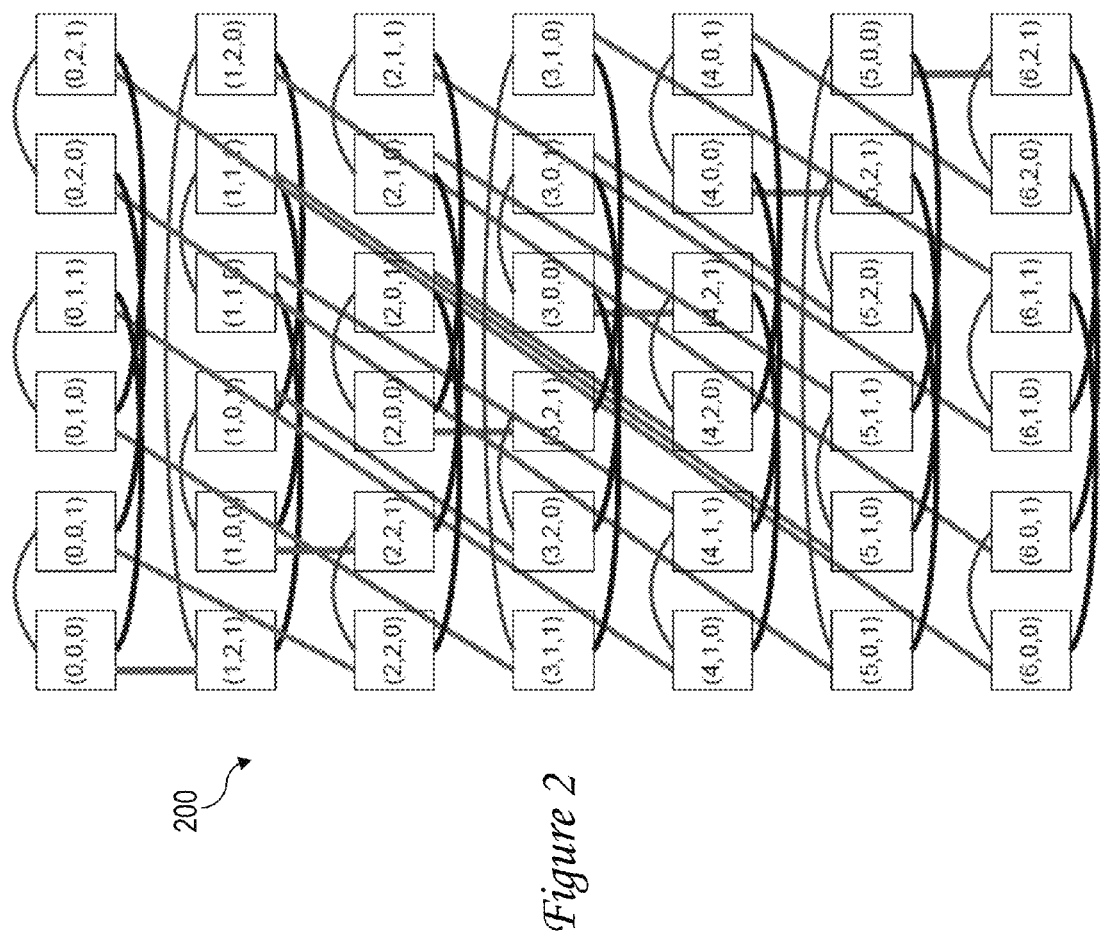
FIG. 2 depicts an exemplary data processing system including an interconnection network having the smallest possible three-tier generalized dragonfly (GDF) topology.

Referring now to FIG. 2, there is depicted an exemplary data processing system 200 including an interconnection network having the smallest possible three-tier dragonfly topology. In the illustrated topology, given by GDF(p; 1, 1, 1), there are $G_3$=7 groups at tier 3 and $S_3$=42 routers in total. Processing nodes (which are preferably integrated into a common substrate with the router as described below with reference to FIG. 10) are again omitted to avoid obscuring the interconnection pattern. It should also be noted that the routers in each successive tier 2 group are right shifted by one position to unclutter the figure.

It should be appreciated that the routers within a GDF topology are subject to a number of different interconnection patterns. In one exemplary implementation, a convenient interconnection pattern in which a particular router $s^a$ with coordinates $\bar{g}^a$=($g_n^a$, $g_{n-1}^a$, ..., $g_i^a$, $g_1^a$) is connected at tier i to $h_i$ different peer routers $s^b(x)$, $0 \le x \le h_i$, with coordinates $\bar{g}^b(x)$=($g_n^b(x)$, $g_{n-1}^b(x)$, ..., $g_i^b(x)$, $g_1^b(x)$) according to the following pattern:

for $0 \le x < h_i$:

$$g_j^b(x) = \begin{cases} g_j^a, & i < j \le n \\ (g_j^a + 1 + \Delta_i^a \cdot h_i + x) \bmod G_j, & i = j \\ G_j - 1 - g_j^a, & 1 < j < i \end{cases}$$

where the global link index $\Gamma_i^a(x) = \Delta_i^a \cdot h_i + x$, where $\Delta_i^a$ is the relative index of router $s^a$ within its group at tier i and is given by:

$$\Delta_i^a = \sum_{k=1}^{i-1} \left(g_k^a \prod_{p=1}^{k-1} G_p\right) = \sum_{k=1}^{i-1} g_k^a \cdot S_{k-1}$$

This interconnection pattern allows each router $s^a$ to easily determine the positions of its neighbors based on its own position $\bar{g}^a$, a dimension index i, and a link index x within that dimension. This knowledge can enable a router to take correct routing decisions. Although routing could be implemented using one or more routing databases, it is preferable, especially when scaling to very large node counts, to implement algorithmic routing by employing strictly topological addressing, thus enabling routing decisions by implementing mathematical operations on the address coordinates.

From the foregoing equations, it is clear that GDF interconnection network topologies scale to extremely large node counts even with small $h_i$ values utilizing just a few tiers. Given a fixed router radix r excluding the end-node-facing ports, the values of $h_i$ can be selected to maximize the total number of routers $S_n$, subject to the constraint $\Sigma_{i=1}^n h_i = r$. For example, in the two-tier case, the total number of routers equals $S_2(h_1, h_2) = h_1^2 h_2 + 2 h_1 h_2 + h_1 + h_2 + 1$. Substituting $h_2 = r - h_1$ in the relation yields $S_2(h1) = -h_1^3 + (r-2)h_1^2 + 2rh_1 + r + 1$. Differentiating this relation with respect to $h_1$ yields $$\frac{\partial S_2}{\partial h_1} = -3h_1^2 + (2r-4)h_1 + 2r.$$

Setting the derivative to zero and solving for $h_1$ finally yields:

$$h_1^{opt} = \frac{1}{3}(r - 2 + \sqrt{r^2 + 2r + 4})$$

which for large r can approximated by $$\frac{h_1^{opt}}{2} = \frac{h_2^{opt}}{1} = \frac{1}{3}r.$$

Because each $h_i$ must be an integer value, the real maximum can be determined by evaluating the integer combinations around the exact mathematical maximum. In the three-tier case, the total number of routers equals $$S_3(h_1,h_2,h_3)=(((h_1+1)h_2+1)(h_1+1)h_3+1)\cdot((h_1+1)h_2+1)(h_1+1),$$

which for large $h_1$ scales as $\tilde{S}_3(h_1, h_2, h_3) = h_1^4 h_2^2 h_3$. Substituting $h_3 = r - h_1 - h_2$ yields $$\tilde{S}_3(h_1,h_2) = rh_1^4 h_2^2 - h_1^5 h_2^2 - h_1^4 h_2^3.$$

Applying partial differentiation of $\tilde{S}_3(h_1, h_2)$ with respect to $h_1$ and $h_2$ gives $$\frac{\partial g}{\partial h_1} = h_1^3 h_2^2 (4r - 5h_1 - 4h_2)$$

and $$\frac{\partial g}{\partial h_2} = h_1^4 h_2 (2r - 2h_1 - 3h_2).$$

Setting each of these partial differentials to zero yields $h_1 = 4(r-h_2)/5$ and $h_1 = (2r-3h_2)/2$, which after simple manipulations results in $$\frac{h_1^{opt}}{4} = \frac{h_2^{opt}}{2} = \frac{h_2^{opt}}{1} = \frac{1}{7}r,$$

meaning that for large r the optimal ratio $h_1:h_2:h_3$ equals 4:2:1.

Using a similar analysis, it can be shown that for a four-tier dragonfly topology, where the total number of routers $S_4$ scales as $h_1^8 h_2^4 h_3^2 h_4$, the optimal choice for the parameters $h_i$ is as follows:

$$\frac{h_1^{opt}}{8} = \frac{h_2^{opt}}{4} = \frac{h_3^{opt}}{2} = \frac{h_4^{opt}}{1} = \frac{1}{15}r.$$

Although these values are approximations, combinations of integer values that are close to these approximations and sum up to r indeed provide the best scaling.

The bisection B (expressed in the number of links) of a two-tier dragonfly DF(p, $h_1$, $h_2$) equals the minimum number of links that need to be cut to separate the network into two equal-sized halves. For balanced networks, this equals the worst-case cut between groups. As each group is connected to all groups in the other half by exactly one link, where the number of groups $G=(h_1+1)h_2+1$, the bisection is given as follows:

$$B = G^2/2, \quad G \bmod 2 = 0$$
$$(G-1)^2/2 + (h^1+1)^2/2, \quad G \bmod 2 = 1$$

Note that each link is counted twice because the links are bidirectional.

For a generalized dragonfly GDF(p; $\bar{h}$), a similar result is obtained. The interconnection network is separated into two halves at the top tier, and the number of global links between the halves is counted. As there are $G_n$ groups at the top tier, if $G_n$ is even, $B_n = G_n^2/2$. The generalized expression for odd $G_n$ is more involved, but for large networks $B_n = G_n^2/2$ is a reasonable approximation:

The relative bisection per node $B_n/N$ can be expressed as follows:

$$B_n/N = G_n^2/2N = \frac{G_n^2}{2p \cdot \prod_{j=1}^n G_j} = \frac{G_n}{2p \cdot \prod_{j=1}^{n-1} G_j} = \frac{\prod_{j=1}^{n-1} G_j \cdot h_n + 1}{2p \cdot \prod_{j=1}^{n-1} G_j} = \frac{1}{2p \cdot \prod_{j=1}^{n-1} G_j} + h_n/2p$$

Thus, $B_n/N > h_n/2p$. Therefore, to ensure full bisection bandwidth $h_n \geq 2p$. Note that this relation depends only on the top-tier $h_n$ and the bristling factor p, but not on the number of tiers n nor on any of the lower-tier values $h_{i<n}$. However, to ensure that the lower tiers do not impose a bottleneck, the number of times each type of link is traversed must be considered. For shortest-path (direct) routing, most paths traverse $2^{n-i}$ links at tier i, where $1 \leq i < n$. Therefore, the values for $h_i$ at each tier should satisfy $h_i = 2h_{i+1}$, where $1 \leq i < n$. Thus, $h_i/h_n = 2^{n-1}$, for $1 \leq i < n$ or $h_i = 2^{n-i+1}p$, for $1 \leq i \leq n$.

The average distance $d_{avg}$ (i.e., the number of inter-router hops) in a two-tier GDF(p; $h_1$, $h_2$) follows from the path count breakdown listed in Table I shown in FIG. 3. By $l_i$ a hop on a link belonging to tier i is denoted.

Hence, the average distance in a two-tier dragonfly network is given by:

$$d_{avg}^{2t} = \frac{3(h_1^2 h_2) + 2(2h_1 h_2) + 1(h_1 + h_2)}{h_1^2 h_2 + 2h_1 h_2 + h_1 + h_2 + 1}.$$

Similarly, the average distance in a three-tier dragonfly network is expressed as:

$$d_{avg}^{3t} = \frac{\begin{matrix} 7(h_1^4 h_2^2 h_3) + 6(4h_1^3 h_2^2 h_3) + \\ 5(2h_1^3 h_2 h_3 + 6h_1^2 h_2^2 h_3) + 4(6h_1^2 h_2 h_3 + 4h_1 h_2^2 h_3) \\ h_1^4 h_2^2 h_3 + 4h_1^3 h_2^2 h_3 + 2h_1^3 h_2 h_3 + \\ 6h_1^2 h_2^2 h_3 + 6h_1^2 h_2 h_3 + 4h_1 h_2^2 h_3 \end{matrix}}{}$$

$$\cdots \frac{+3(h_1^2 h_2 + h_1^2 h_3 + h_2^2 h_3 + 6h_1 h_2 h_3) +}{+h_1^2 h_2 + h_1^2 h_3 + h_2^2 h_3 + 6h_1 h_2 h_3 + 2h_1 h_2 +} $$
$$\frac{2(h_1 h_2 + 2h_1 h_3 + 2h_2 h_3) + 1(h_1 + h_2 + h_3)}{2h_1 h_3 + 2h_2 h_3 + h_1 + h_2 + h_3 + 1}$$

As discussed above, satisfying $h_i = 2^{n-i+1}p$, for $1 \leq i < n$ provides full bisection bandwidth. However, the notion of a balanced dragonfly network requires only half bisection bandwidth, because a balanced dragonfly network assumes uniform traffic. For uniform traffic, only half of the traffic crosses the bisection. Correspondingly, the $h_i/p$ values for a balanced multi-tier dragonfly network are halved: $h_i = 2^{n-i}p$, for $1 \leq i < n$. Note that these ratios between the $h^i$ values are also the optimal ratios between $h_i$ values to achieve the maximum total system size.

Formally, a GDF(p; ($h_1, \ldots, h_n$)) is referred to as balanced if for all i, $1 \leq i < n$, $h_i/h_{i+1} = H_i/H_{i+1}$, where $H_i$ represents the total number of tier-i hops across all shortest paths from a given node to every other node, which is equivalent to the hop-count distribution under uniform traffic. The balance ratios $\beta_{i,j}$, are defined as $\beta_{i,j} h_i H_j / h_j H_i$. A network is perfectly balanced when for all i, $1 \leq i < n$: $\beta_{i,i+1} = 1$. In practice, achieving ratios exactly equal to one may not be possible, so it is preferable if the ratios are as close to 1 as possible. If $\beta_{i,i+1} > 1$, the network (at tier i) is overdimensioned, whereas the network is underdimensioned if $\beta_{i,i+1} < 1$. It should be noted that as employed herein the term "balance" relates specifically to bandwidth, not router port counts; however, as equal bandwidth on all links is assumed herein (unless specifically stated otherwise), router port count and link bandwidth can appropriately be viewed as equivalent concepts.

The relation $h_i = 2^{n-i} p$, for $1 \leq i < n$ for balanced dragonfly networks is sufficient but conservative for a balanced network because, depending on h, a certain fraction of minimal paths are shorter than $2^{n-1}$ hops. More precisely, for a two-tier dragonfly network, the ratio between the number of 1 versus $l_2$ hops equals $$\frac{H_1}{H_2} = \frac{2h_1^2 + 2h_1 h_2 + h_1}{h_1^2 h_2 + 2h_1 h_2 + h_2}.$$

As a consequence, for small first-tier groups, the effective balance factor is clearly smaller than 2. The exact ratio between $h_1$ and $h_2$ for a balanced network can be determined by solving $\beta_{1,2} = 1$. In particular, since $h_1 = h_2 H_1/H_2$, $h_1 = h_2 - 1 + \sqrt{h_2^2 + 1} \approx 2h_2 - 1$.

Figure 4:
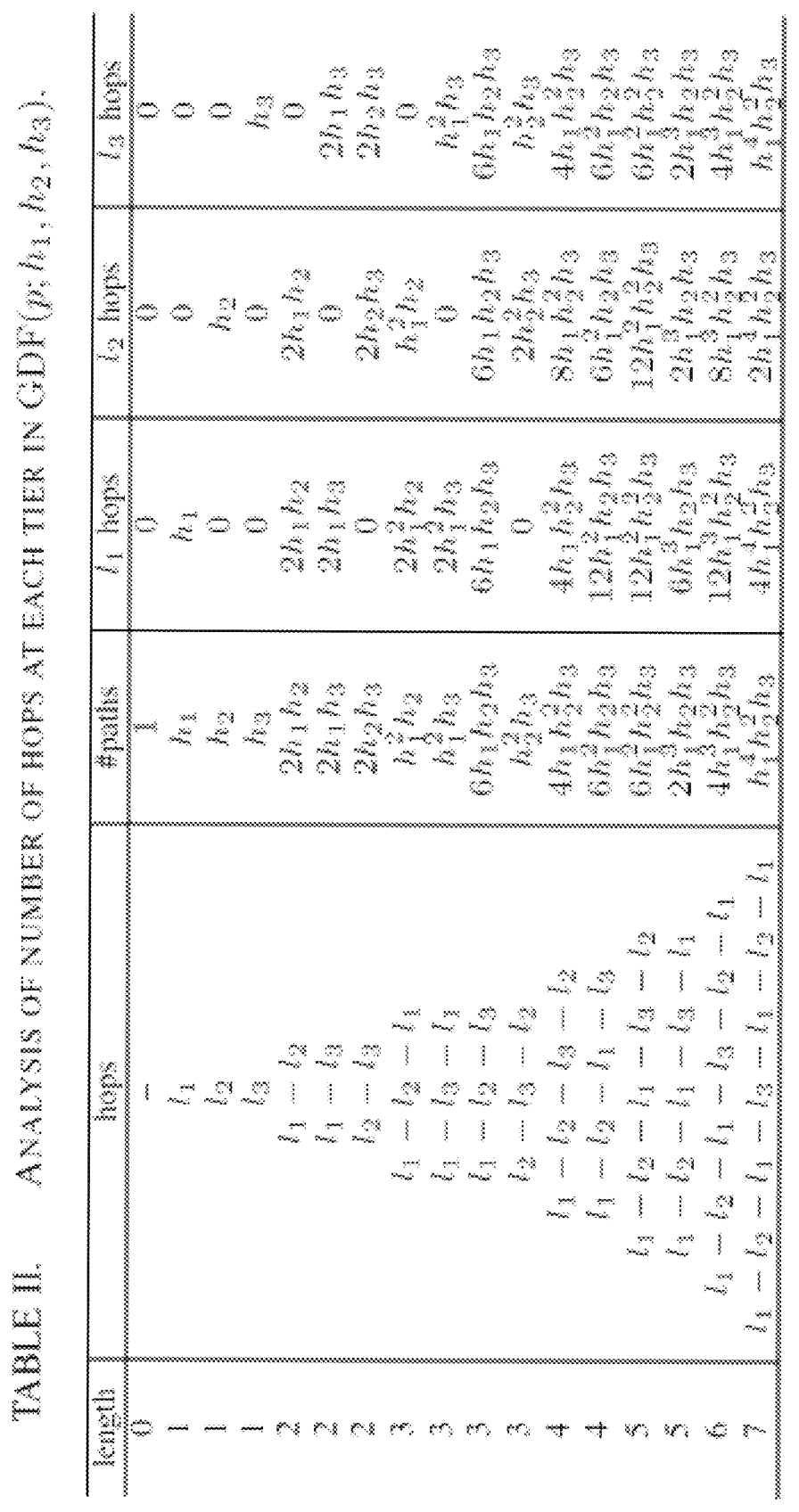

For three-tier balance, Table II shown in FIG. 4 lists all the different path types, all paths of a given type having the same number of hops for each link type ($i_1, l_2, l_3$), the number of times each path type occurs, and the number of hops per link type for each path type. Note that most path types can occur in different variants (e.g., $1_1-1_2$ and $1_2-1_1$), which is accounted for in the third column.

From Table II, the total number of hops $H_i$ per link type $l_i$ can be obtained as follows:

$H_1 = h_1(1+2h_2+2h_1 h_2+h_3(2+2h_1+6h_2+4h_2^2+12h_1^2 h_2^2 + 4h_1^3 h_2^2))$ $H_2 = h_2(1+2h_1+2h_1^2+h_3(2+2h_1+6h_1+2h_2+8h_1 h_2+6h_1^2 + 12h_1^{2h}+2h_1^3+8h_1^3 h_2+2h_1^4 h_2))$ $H_3 = h_3(1+2h_1+2h_2+h_1^2+6h_1 h_2+h_2^2+4h_1 h_2^2+6h_1^2 h_2 + 6h_1^2 h_2^2++2h_1^3 h_2+4h_1^3 h_2^2+h_1^4 h_2^2)$

From these relations, the balance ratios $H_1/H_2$ and $H_2/H_3$ can be determined. Although the value of $H_1/H_2$ is not entirely independent of $h_3$, it can be shown that the derivative $$\frac{\partial H_1}{\partial h_3}$$

is extremely close to zero (<4e-16) for any valid combination of $h_1$, $h_2$, and $h_3$, implying that the two-tier balance condition for $h_1$ and $h_2$ also holds in the three-tier case. The condition for $h_3$ can be determined by solving $h_3 = h_2 H_3/H_2$, which following reductions yields.

$$h_3 = \frac{h_2^2 + h_2}{2h_2^2 + 1} \approx \frac{h_2}{2}.$$

It should further be appreciated that the condition $h_i = 2 h_{i+1}$ for a balanced network is satisfied by any combination $h_i \cdot BW_i = 2 \cdot (h_{i+1} \cdot BW_{i+1})$, where $BW_i$ is the bandwidth per port at tier i, which could be achieved by doubling $BW_{i+1}$ rather than $h_{i+1}$.

Substituting the conditions for a balanced dragonfly network into the expression for the total number of nodes N yields an expression for N that depends only on a single variable, allowing the network parameters p and $h_i$ to be uniquely determined as a function of N. For example, for a two-tier topology, $N = 4h_2^4 + 2h_2^2$. Solving this equation for $h_2$ yields $$h^{bal-2t}(N) = \frac{1}{2}\sqrt{\sqrt{(4N+1)} - 1},$$

which for large N is approximately equal to $$\sqrt[4]{N}/\sqrt{2}.$$

Therefore using the conditions for a balanced dragonfly topology, the balanced router radix for the two-tier case equals $$r_{bal-2t}(N) = 4h_2 - 1 = 2\sqrt{\sqrt{(4N+1)} - 1} - 1.$$

It can similarly be shown that for the three-tier case the respective expressions are:

$$N = 1024h_3^8 + 256h_3^6 + 48h_3^4 + 4h_3^2$$

$$h^{bal-3t}(N) = \frac{1}{4}\sqrt{\sqrt{4\sqrt{4N+1} - 3} - 1}$$

$$r_{bal-3t}(N) = 8h_3 - 1 = 2\sqrt{\sqrt{4\sqrt{4N+1} - 3} - 1} - 1.$$

Network costs in terms of number of routers and inter-router links per end node equal 1/p routers/node and $$\frac{p + \sum_{j=1}^{n} h_i}{p}$$

links/node. For balanced networks these ratios amount to $1/h_2$ and $(4h_2-1)/h_2 \approx 4$ for two tiers and $1/h_3$ and $(8h_3-1)/h_3 \approx 8$ for three tiers.

Turning now to routing considerations, routing packets in an interconnection network having a dragonfly topology can include both shortest-path, i.e., minimal or direct routing, as well as non-minimal or indirect routing. Because exactly one shortest path exists between any pair of routers (or processing nodes), minimal routing is the more straightforward case. In a preferred embodiment, a dimension order routing approach is implemented in which each dimension corresponds to a tier of the dragonfly topology. The routers comprising the minimal route determine the minimal route in n phases, where at each phase, one or more of the routers in the minimal route compares its coordinates and those of the destination router and routes the packet to the correct position (group) in the current dimension (tier) before the packet is passed to the next dimension. In a GDF, routers preferably order the dimensions from most to least significant, because routing to a destination group at a certain tier i may require hops through some or all of the dimensions lower than i as well.

As an example, assuming n=3, source coordinates ($g_1^s$, $g_2^s$, $g_3^s$) and destination coordinates ($g_1^s$, $g_2^s$, $g_3^s$), the routing algorithm implemented by the routers in the dragonfly interconnection network first routes to the correct destination group at tier 3 (x, y, $g_3^d$), then within that top-tier group to the correct subgroup at tier 2 (x, $g_2^d$, $g_3^d$), and finally to the correct sub-subgroup at tier 1 ($g_1^d$, $g_2^d$, $g_3$). Because of the particular structure of a GDF, in which exactly one link connects two given groups at a given tier, each of the n routing phases (one per dimension) may require intermediate hops to get to the router that connects the current group to the destination group.

Figure 5:
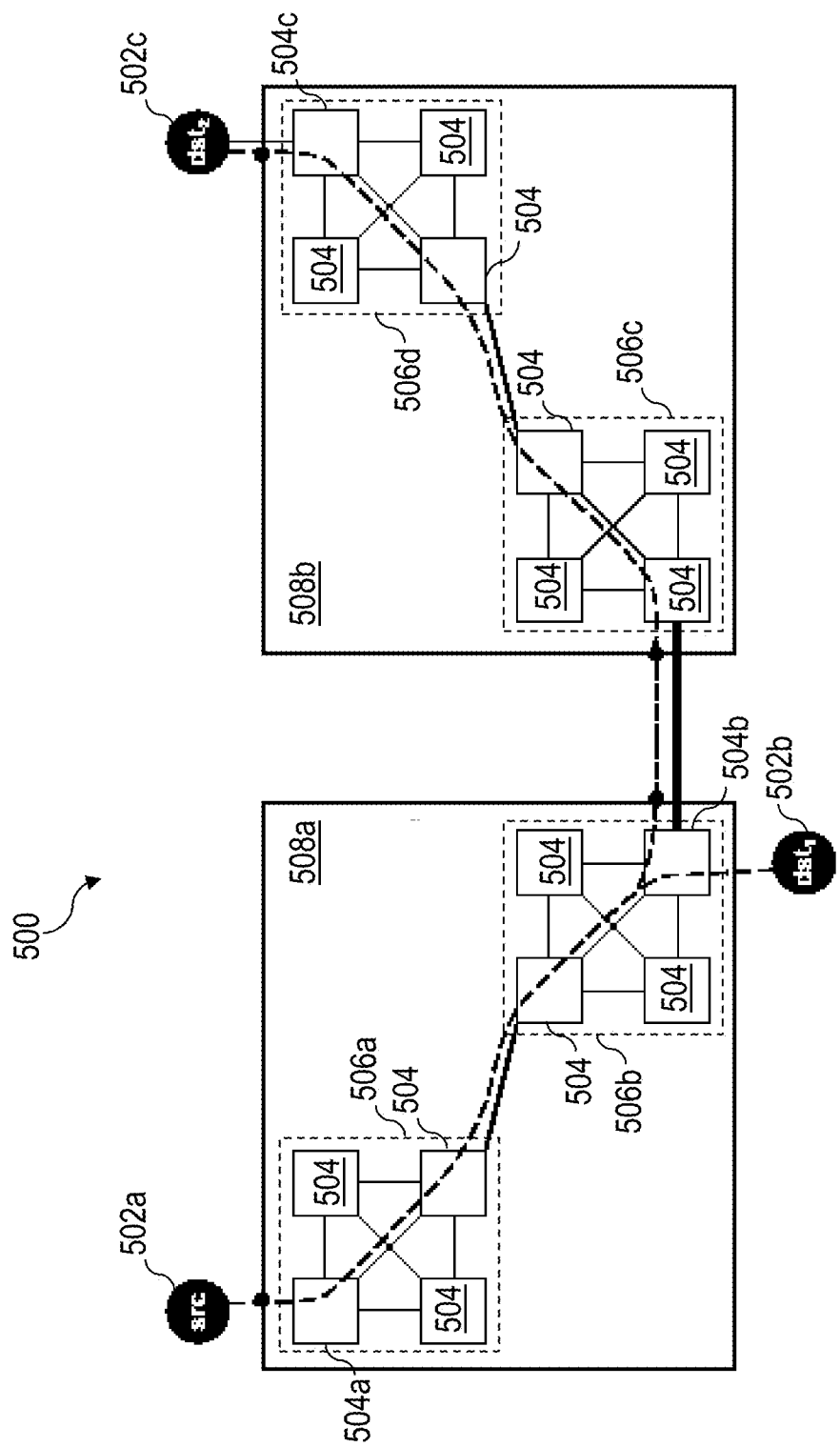
FIG. 5 illustrates an example of a multi-tier dragonfly interconnection network that shows the recursive nature of minimal path routing in a multi-tier dragonfly topology.

With reference now to FIG. 5, an example of a multi-tier dragonfly interconnection network 500 is illustrated that shows the recursive nature of minimal path routing in a multi-tier dragonfly topology. In this example, interconnection network 500 includes a source processing node 502a, a first destination processing node 502b and a second destination processing node 502c. Processing nodes 502a-502c are interconnected by a plurality of routers 504 interconnected in a dragonfly interconnection network including a plurality of first tier groups 506 including a first tier group 506a that includes a router 504a to which source processing node 502a is directly connected, a first tier group 506b that includes a router 504b to which first destination processing node 502b is directly connected, a first tier group 506c, and a first tier group 506d that includes a router 504c to which second destination processing node 502c is directly connected. As shown, first tier groups 506a-506b in turn belong to a second tier group 508a, and first tier groups 506c-506d in turn belong to a second tier group 508b.

In a generalized dragonfly topology, the diameter at tier i is denoted by $d_i$. From the above discussion, it follows that the diameter at successive tiers can be derived by the simple recursive formula $d_i = 2d_{i-1}+1$, $1 \le i \le n$, with $d_0=0$. It follows that the diameter $d_n$ is given by $$d_n = \sum_{i=0}^{n-1} 2^i = 2^n - 1$$

In this example, the distance from source processing node 502a to first destination node 502b equals three, that is, the diameter at tier 2 (i.e., $d_2$) equals 3. The distance from source processing node 502a to second destination processing node 540c equals twice the diameter at tier 2 plus the hop connecting the two tier-2 groups 508a-508b. Hence, the diameter at tier 3 (i.e., $d_3$) equals 7.

For non-minimal routing, path diversity in a GDF network is immense, and many different techniques of performing indirect routing, such as Valiant routing, are possible. In Valiant routing, a packet is first routed to a randomly selected intermediate group at the "nearest common ancestor" tier between the source and the destination processing nodes, and from there to the destination processing node. In other words, given that both source and destination processing nodes are within the same group at tier i, Valiant routing allows an indirect path to visit one intermediate group at tier i−1. For instance, if source and destination processing nodes are within the same tier 1 group, the longest indirect path is $l_1 \rightarrow l_1$ (the intermediate "group" in this case comprises just a single router). If source and destination processing nodes are within the same tier 2 group, then the longest (5-hop) indirect path is $l_1 \rightarrow l_2 \rightarrow l_1 \rightarrow l_2 \rightarrow l_1$, whereas if the direct path leads up to tier 3, a corresponding (11-hop) indirect path is $l_1 \rightarrow l_2 \rightarrow l_1 \rightarrow l_3 \rightarrow l_1 \rightarrow l_2 \rightarrow l_1 \rightarrow l_3 \rightarrow l_1 \rightarrow l_2 \rightarrow l_1$. It follows that the longest indirect path according to Valiant routing policy has a length of $2n^{1-1}+2^n-1=3 \cdot 2^{n-1}-1$ hops. A variant of Valiant routing, Valiant-Any, which can mitigate certain adverse traffic patterns, allows misrouting to any intermediate router rather than any intermediate group. In this case the longest indirect path length equals $2(2^n-1)=2^{+1}-2$ hops.

Shortest-path routing in dragonfly networks is inherently prone to deadlocks because shortest-path routing induces cyclic dependencies in the channel dependency graph. Without a proper deadlock avoidance policy in place, forward progress cannot be guaranteed. It has previously been demonstrated that to guarantee deadlock freedom the basic two-tier dragonfly requires for the tier-1 links two virtual channels for shortest-path routing and three virtual channels for indirect routing.

Figure 6B:
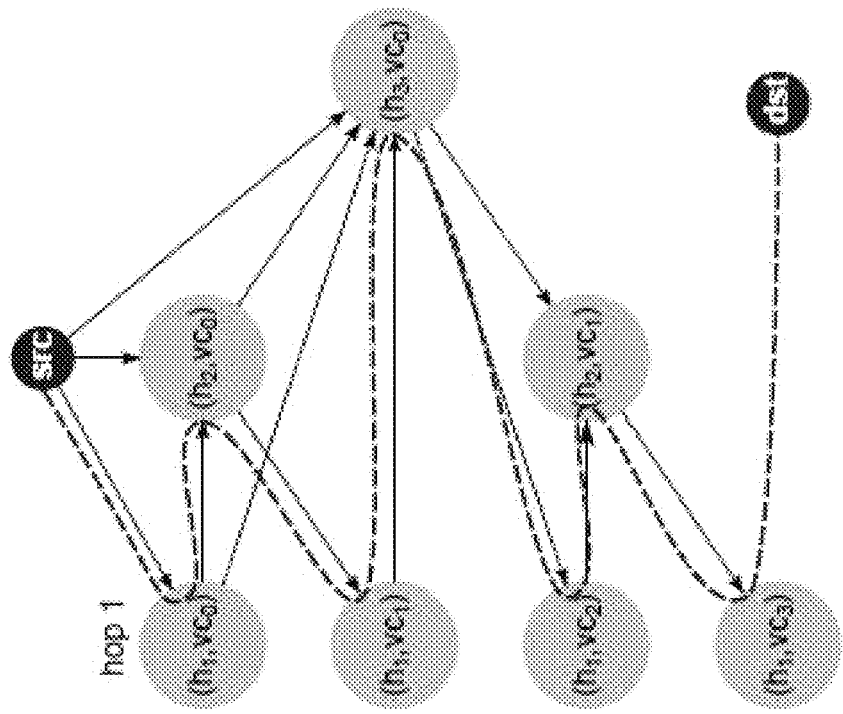
FIG. 6B illustrates a deadlock-free virtual channel assignment policy for minimal routing in the three-tier GDF topology.
Figure 6A:
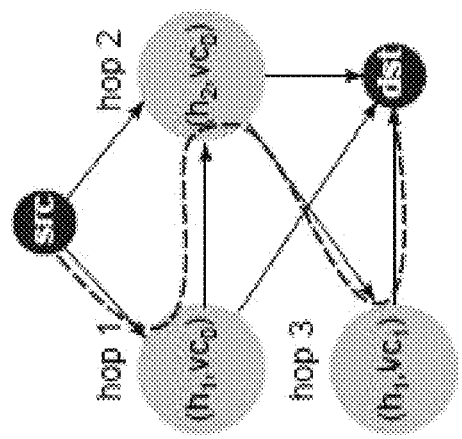
FIG. 6A depicts a deadlock-free virtual channel assignment policy for minimal routing in the two-tier GDF topology.
Figure 6C:
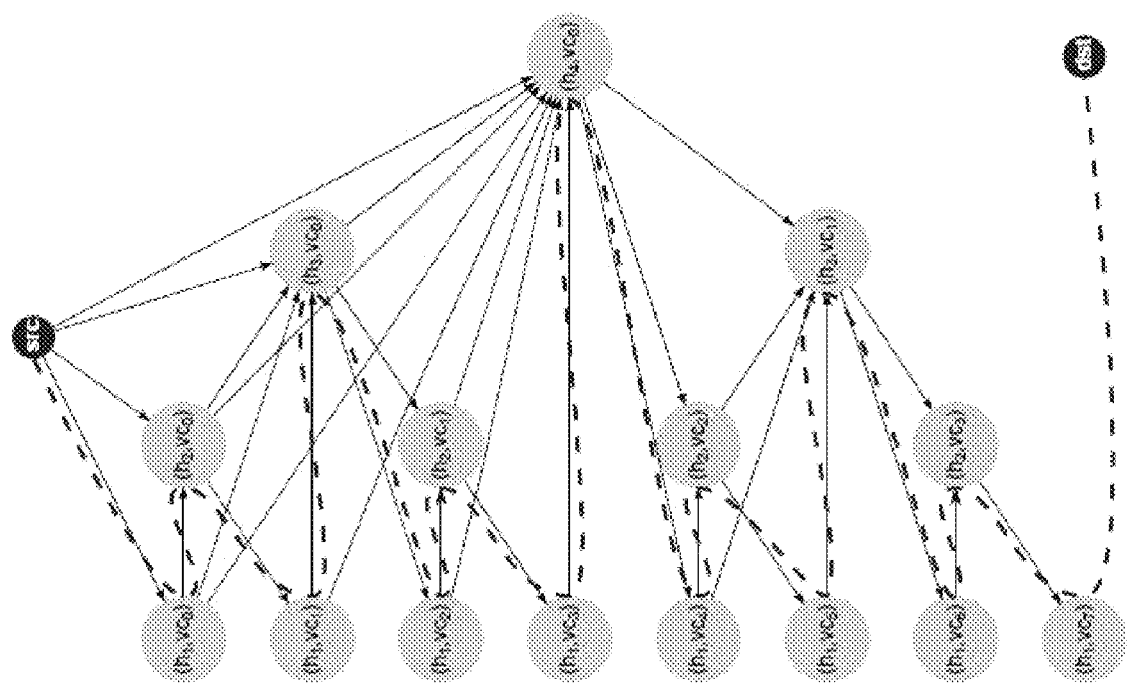
FIG. 6C depicts a deadlock-free virtual channel assignment policy for minimal routing in the four-tier GDF topology.

To guarantee deadlock freedom in GDF topologies with an arbitrary number of tiers, a sufficient number of virtual channels (VC) must be allocated. Referring now to FIGS. 6A-6C, there are depicted channel dependency graphs for two-, three-, and four-tier dragonfly topologies, respectively. In FIGS. 6A-6C, source and destination processing nodes are illustrated connected via circles each representing a respective class of channels identified by dimension i and by virtual channel j. Note that there are no self-dependencies, as links belonging to the same dimension can never be traversed consecutively. The dashed line in each figure indicates the VC assignment policy for a worst-case shortest path.

FIG. 6A illustrates a deadlock-free virtual channel assignment policy for minimal routing in the two-tier case. The VC identifier is incremented when moving from a hop at tier 2 ($l_2$) to a hop at tier 1 ($l_1$). This VC incrementation is sufficient to break cyclic dependencies. In the three-tier case shown in FIG. 6B, a total of four VCs on the lowest tier, two VCs on the second tier and one VC on the third tier is necessary. (To unclutter the figure, the arrows from the various classes of channels towards the destination processing node are omitted, as each of the hops can be the final one in the path.) The four-tier case shown in FIG. 6C employs a total of eight VCs on the lowest tier, four VCs on the second tier, two VCs on the third tier and one VC on the fourth tier.

In the general case, a GDF with n tiers requires $2^{n-i}$ virtual channels for deadlock avoidance with shortest-path routing on tier i. This follows from the maximum number of times that hops at a given tier are visited, which is exactly $2^{n-i}$ for tier i for the worst-case shortest paths.

Given an incoming port corresponding to tier $l_1$; and channel $vc_1$, an outbound port corresponding to tier $l_2$ and channel $vc_2$, with $\lambda=|l_2-l_1|$ being the number of tiers crossed, then the outbound virtual channel $vc_2$ is given by $$vc_2 = \lfloor vc_1/2^\lambda \rfloor, l_2 > l_1$$
$$= vc_1 \cdot 2^\lambda + 2^{\lambda-1}, l_2 < l_1$$

Note that assigning the next VC according to this deadlock-free general-case VC assignment policy only requires knowledge of the current VC and the current and next dimension, and can be implemented by the routers in a GDF network using simple shifting and addition operations.

The indirect routing paths described above require additional virtual channels for deadlock-free operation, as the additional available routes can create additional cycles in the channel dependency graphs. For Valiant routing, the maximum number of hops at a given tier i of such an indirect path equals $2^{n-i-1}+2^{n-i}$ (for n−i≥1; at tier n there are two hops at maximum). Correspondingly, each link at tier i should provide at least $2^{n-i-1}+2^{n-i}$ virtual channels. For the tier-1 links, this policy implies three channels for n=2 and six for n=3.

Consequently, the virtual channel assignment policy set forth above changes. As an indirect path is composed of an initial Valiant component from the source processing node to the selected intermediate destination, followed by the shortest path from the intermediate destination to the actual destination processing node. The number of tier-i hops of the first and second components are at most $2^{n-i}$ and $2n^{-i-1}$, respectively. For the second component, the VC assignment policy set forth above is applied, with VCs numbered from 0 to $2^{n-i-1}$ for each tier as before. For the first component, which is roughly half a shortest path, the shortest-path assignment is also applied, except that the VCs are numbered from $2^{n-i}$ to $2^{n-i}+2^{n-i-1}-1$. Therefore, prior to applying the VC assignment policy set forth above, a value of $2^{n-i}$ is subtracted, and added back in afterwards. To correctly compute the VC, the VC assignment policy must therefore be aware of whether the routing phase is Valiant (first part) or not (second part).

The present disclosure further appreciates that the GDF topology described previously, which employs only a single link between each pair of groups at a given tier, can be extended to employ multiple links between groups. This arrangement gives rise to a new class of interconnection networks referred to herein as extended generalized dragonfly (XGDF) topologies. XGDF networks cover the entire spectrum of network topologies from fully-scaled dragonflies to Hamming graphs, in which each router is directly connected with its peers in each of the other groups at each tier. Note that XGDF topologies can all be built using different configurations of the same "building block" router.

An extended generalized dragonfly is specified by XGDF (p; $\bar{h}$; $\bar{b}$). In addition to p and $\bar{h}=(h_1, \ldots, h_n)$, which have the same meaning as defined for the base GDF topology, a vector of bundling values $\bar{b}=(b_1, \ldots, b_n)$ is specified, indicating the number of links in between each pair of groups at each tier i. Note that the case $b_i=1$ for all i corresponds to the base GDF topology with a single link in between each pair of groups.

FIG. 7 illustrates an example of an XGDF topology with a bundling factor $b_2=2$. This topology has $((h_1/b_1+1)h_2)/b_2+1=7$ groups of 4 routers each where $b_i$ is a divisor of the number of switches per tier 1 group. Alternatively, one could choose the bundling factor $b_2$ equal to 3 or 6. With $b_2=3$, the resulting topology would have five groups, whereas with $b_2=6$ the topology would have three groups.

To obtain a completely regular topology, the constraint is imposed that, at each tier i, the number of outbound links from a tier-(i−1) group must be an integer multiple of $b_i$, so that each bundle has exactly the same number of subgroups and links:

$$\forall i: \left(h_i \prod_{j=1}^{i-1} G'_j\right) \bmod b_i = 0$$

Moreover, it is assumed $b_1=1$, because there are no subgroups at the first tier and from a topological perspective it is not useful to introduce multiple links between a pair of routers. (Although such redundant links can be present for non-topological reasons.)

The number of groups at each tier $G_i'$ is given by the following equations:

$$G'_1 = \frac{h_1}{b_1} + 1$$

$$G'_2 = \frac{G'_1 h_2}{b_2} + 1$$

$$G'_3 = \frac{G'_1 G'_2 h_3}{b_3} + 1$$

$$G'_n = \frac{\left(\prod_{j=1}^{n-1} G'_j\right) h_n}{b_n} + 1$$

The total number of switches $S_i'$ in one of the groups at tier i is given by the product of the group sizes up to tier i:

$$S'_i = \prod_{j=1}^{i} G'_j$$

The total number of nodes N' in the system equals $N'=pS'_n$. Each switch in the topology can be uniquely identified by an n-value coordinate vector $(g_1, g_2, \ldots, g_n)$, with $0 \leq g_i < G'_i$ with each coordinate indicating the relative group position at each tier of the hierarchy.

"Full bundling" at tier i is defined herein as the case where $$b_i = \prod_{j=1}^{n-i} G'_j$$

such that $G_i'=h_i+1$. This relation implies that every router has a direct link to its respective peers in each other group at tier i. If all tiers have full bundling, the topology is equivalent to a prior art HyperX (i.e., Hamming graph) topology. Consequently, herein it is assumed that an XGDF does not have full bundling at all tiers. It should be noted that the number of groups at each tier and therefore the total number of routers and end nodes decreases with increasing values of $b_i$. By virtue of the XGDF definition, the switch radix is independent of the $b_i$ value, $r=p+\Sigma_{j=1}^n h_i$. Therefore, bundling trades off network scale for average distance, and a bundled network requires a larger router radix than one without bundling in order to scale to the same size.

The interconnection pattern for an arbitrary XGDF is the same as that for a GDF topology, with one minor modification to $\Gamma_i^a(x)$:

$$\Gamma_i^a(x) = (\Delta_i^a \cdot h_i + x) \bmod (G_j - 1)$$

to account for the fact that there are now more global links than the number of (other) remote groups $G_j - 1$.

As every group is connected to every other group by $b_n$ links, the number of links that cross the bisection at the top tier equals $B'_n = (G'_n)^2 b_n / 2$ (assuming $G'_n$ is even). Hence, the relative bisection per node can be given as:

$$\frac{B'_n}{N'} = \frac{G'_n}{2N'} = \frac{(G'_n)^2 b_n}{2p \cdot \prod_{j=1}^{n} G'_j} =$$

$$\frac{G'_n}{2p \cdot \prod_{j=1}^{n-1} G'_j} = \frac{\left(\frac{\prod_{j=1}^{n-1} G'_j \cdot h_n + 1}{b_n} + 1\right) b_n}{2p \cdot \prod_{j=1}^{n-1} G'_j} = \frac{b_n}{2p \cdot \prod_{j=1}^{n-1} G'_j} + \frac{h_n b_n}{2p b_n} > \frac{h_n}{2p}$$

The significance of this result is that the top-tier bisection does not depend on $b_n$, but only on $h_n$. Similarly, the bisection bandwidths at lower tiers also do not depend on b. In other words, the relative bisection of an XGDF is not affected by the bundling factors, but is determined fully by $\bar{h}$.

The average distance in a two-tier XGDF($p$; $h_1$, $h_2$; 1, $b_2$) is given by $$d_{avg}^{2t} = \frac{3\left(x^2 \frac{h_2}{b_2}\right) + 2\left(\left(\frac{h_1}{b_1} + x\right) h_2\right) + 1\left(\frac{h_1}{b_1} + h_2\right)}{\frac{h_1^2 h_2}{b_1^2 b_2} + 2 \frac{h_1 h_2}{b_1 b_2} + \frac{h_1}{b_1} + \frac{h_2}{b_2} + 1}$$

Here, the correction factor x accounts for the fact that—unlike in GDFs without bundling—there may be multiple shortest paths to a given node:

Routing in an XGDF is in principle the same as in a GDF as groups are traversed in a hierarchical manner. The longest direct routes are identical to those for the GDF without bundling. However, in the case where full bundling is implemented at a certain tier, the route at that tier "degenerates" in the sense that no hops at a lower tier are necessary to each the destination group because each switch has a direct links to all its peers. Even in a full-scale non-bundled dragonfly topology, a certain fraction of the routes is (partially) degenerate. An example of this in a two-tier dragonfly topology is the four routes $l_1$, $l_2$, $l_1 \rightarrow l_2$, and $l_2 - l_1$. As the bundling factor increases, the relative fraction of such routes will increase, because there are more switches at a given tier that have a link to a given destination group at that tier.

In the extreme case of the Hamming graph, all shortest paths have exactly n hops vs. $2^{n-1}$ for the full-scale dragonfly topology. Naturally, this also has implications for network balance and deadlock avoidance. Deadlocks disappear entirely in Hamming graphs as long as a strict dimension-order routing policy is applied, so multiple virtual channels would not be required for direct, shortest path routing. A second virtual channel is required, however, for indirect routing.

As there are multiple paths between peer groups in a bundled network, at each tier a specific link must be selected. In a preferred embodiment, routers in an XGDF topology implement a shortest-path routing scheme that load balances the traffic equally across the available paths. For example, routers at every tier may select a link from a bundle utilizing a hashing function on packet ID, source, and destination. This load-balancing is preferably implemented when the source router is not connected to the destination group and the destination router is not connected to the source group to ensure the shortest-path property. This shortest-path routing algorithm induces an imbalanced usage of local links, however. To illustrate this point, consider a simple case with n=2 and $b_2 > 1$, XGDF(p; $h_1$, $h_2$; 1, $b_2$). In such a system, a given router with coordinates ($x_1$, $x_2$) is one of $b_2$ local routers all connecting to each specific remote group to which this router is also connected. The local links of the designated router can be classified into two types: Type 1 links connect to a local router that does not connect to the same remote groups, and Type 2 links connect to a local router that does connect to the same remote groups. Assuming uniform random traffic (without self-traffic), the relative load on each remote link arriving at the router equals $\rho = G_1 / b_2 G_2$.

Given a traffic arrival intensity of $\mu$, the total load on local links of Types 1 and 2 equals $$\lambda_{T1} = \mu p \left( \frac{1}{G_1 G_2} + \frac{\rho h_2}{G_1} + \frac{h_2}{b_2 G_2} \right)$$

$$\lambda_{T2} = \mu p \left( \frac{1}{G_1 G_2} + \frac{\rho h_2}{G_1} + 0 \right)$$

where the first terms corresponds to local traffic, the second terms to traffic arriving from remote links, and the third terms to traffic with a destination in a remote group other than the one to which the designated router connects. Note that the third terms are the ones that cause the imbalance—because of the shortest-path requirement, a router may not load-balance remote traffic to remote groups to which it itself has a link.

From the above, it follows that the load ratio between the two types of local links equals $$\frac{\lambda_{T1}}{\lambda_{T2}} = \frac{1 + 2 \frac{G_1 h_2}{b_2}}{1 + \frac{G_1 h_2}{b_2}}$$

which for large values of the ratio $(G_1 h_2)/b_2$ approaches two. This ratio represents the worst-case imbalance, which only applies to networks in which the third term is either zero or maximum. This third term, which represents traffic generated at the local source router with a destination in a remote group, depends on how many remote groups the local source router and the local intermediate router have in common. This overlap $\Omega(l)$ can range from 0 to $h_2$. If $\Omega(l)=0$ then the total load for Type 1 links applies, and if $\Omega(l)=h_2$ then the total load for Type 2 links applies. As the overlap may be different for every local link, the load on links can be generalized as follows:

$$\lambda_l = \mu p \left( \frac{1}{G_1 G_2} + \frac{\rho h_2}{G_1} + \frac{h_2}{b_2 G_2} \left( 1 - \frac{\Omega(l)}{h_2} \right) \right)$$

To determine the maximum load $\lambda_l$ across all local links l of a given router, the minimum $\Omega_{min} = \min_l (\Omega(l))$. If the number of remote groups $G_1 h_2/b_2$ is at least twice the number of remote links $h_2$, i.e., $G_1 h_2/b_2 \geq 2h_2$, then there is at least one link for which $\Omega(l)$ equals zero, namely the link to the next local router, and therefore $\Omega_{min} = 0$, such that the generalized link load equation reduces to that of the Type 1 links. This condition can be simplified to $G_1/b_2 \geq 2$. If $b_2 = G_1$, the tier implements full bundling, in which all local routers have links to all remote groups, i.e., $\Omega(l) = h_2$ for all l and therefore $\Omega_{min} = h_2$, such that the link load reverts to that of Type 2 links as each path contains only one local hop. For the intermediate range $1 < G_1/b_2 < 2$ it can be shown that $$\Omega_{min} = 2h_2 - \frac{G_1 h_2}{b_2} = h_2 \left( 2 - \frac{G_1}{b_2} \right)$$

and, taking into account the other cases above, for $G_1/b_2 \geq 1$ $$\Omega_{min} = \max\left( 0, h_2 \left( 2 - \frac{G_1}{b_2} \right) \right).$$

This expression is required to compute the correct topology values for a balanced XGDF.

From the foregoing discussions on network bisection and shortest path routing, it follows that the conditions for a balanced multi-tier dragonfly network set forth above are sufficient for a balanced XGDF network. However, higher values for $b_i$ also increase the number of "degenerated" minimal paths, thus reducing average minimal path length. Therefore, the usage ratios of lower tier to higher-tier links also decrease. Table III depicted in FIG. 8 analyzes this effect for two-tier XGDF networks. The correction factor x is given by the relation, supra.

For an XGDF network of two tiers, the corresponding balance ratio equals $$\frac{H_1}{H_2} = \frac{2x^2 \frac{h_2}{b_2} + xh_2 + \frac{h_1}{b_1} h_2 + \frac{h_1}{b_1}}{x^2 \frac{h_2}{b_2} + xh_2 + \frac{h_1}{b_1} h_2 + h_2}$$

The balance ratio quickly decreases as a function of $b_2$. The extreme case of $b_2 = 2h_2 + 1$ (x=0) corresponds to a HyperX topology; correspondingly, the balance ratio equals $(h_1 h_2 + h_1)/(h_1 h_2 + h_2)$ at that point, which is close to 1 for large $h_1$, $h_2$. To find a balanced ratio between $h_1$ and $h_2$, a solution for $h_1 = h_2 H_1/H_2$ is computed. This equation has an intricate closed-form solution, for which a good approximation is given by $h_1 \approx 2h_2 - b_2$, so the tier-1 group size can be decreased relative to $h_2$ as $b_2$ increases.

Based on the foregoing discussion regarding link loading, the condition for p can be derived as follows. The utilization of the higher-utilized "Type 1" tier-1 links is given by the equation set forth above. To prevent these links from becoming a bottleneck, the following relation must hold:

$$p \leq \frac{1}{\frac{1}{G_1 G_2} + \frac{h_2}{b_2 G_2} + \frac{h_2}{b_2 G_2} \left( 1 - \frac{\Omega_{min}}{h_2} \right)},$$

which yields $$p \leq \frac{1}{1 + \frac{G_1 h_2}{b_2} \left( 2 - \frac{\Omega_{min}}{h_2} \right)}.$$

This can be approximated by $$p \leq \begin{cases} h_2 - \frac{b_2}{2} & \text{for } b_2 \leq \frac{2h_2}{3} \\ b_2 & \text{for } b_2 > \frac{2h_2}{3}, \end{cases}$$

which implies that in the extreme cases of the fully-scaled dragonfly ($b_2 = 1$) and the Hamming graph ($b_2 = h_1 + 1$) the balanced bristling factor equals $h_2$, but for intermediate values of $b_2$, it can be as low as $2h_2/3$.

For XGDF topologies having three tiers, bundling is too complex to be readily analyzed in closed-form. Therefore, an analysis was performed using a C++ simulated implementation of a generic XGDF topology and its corresponding shortest-path routing algorithm. By traversing all paths from a selected source processing node to every other destination processing node, the number of times a hop at each tier is traversed can be determined. This yields the per-tier hop counts $H_i$, from which the relative balance ratios $\beta_{1,2}$ and $\beta_{2,3}$ can be determined.

To develop a suitable sample set, this simulation analysis was performed for 457 different three-tier XGDF topologies, subject to the constraint $h_3 = 2$, which is sufficient to scale to balanced networks with up to 444,222 nodes, i.e., XGDF (2:8, 4, 2:1, 1, 1). Given the upper bound on the balance conditions, every $h_2 \in [h_3, 2h_3]$ and for every value of $h_2$ every $h_1 \in [h_2, 2h_2]$ was analyzed. For each of these triples $(h_1, h_2, h_3)$, every value of $b_2$ such that $G_1 h_2 \mod b_2 = 0$ and $b_2 \leq G_1$ was analyzed, and for each of those values of $b_2$ every value of $b_3$ such that $G_1 G_2 h_3 \mod b_3 = 0$ and $b_3 \leq G_1 G_2$. Out of the 457 topologies analyzed, 23 are nearly optimally balanced, in the sense that they satisfy $0.96 \leq \beta_{1,2}, \beta_{2,3} < 1.1$. For these 23 topologies summarized in FIG. 9 in Table IV, a deeper analysis was also performed to determine the maximum bristling factor $p_{max}$ by traversing all paths that cross a given router. The maximum utilization across all tiers determines the maximum injection load per router, which can be equated with the bristling factor. (Note that strictly speaking p does not have to be an integer value; non-integer bristling factors could be achieved by running the node links at a different speed than the network links.) These values are also listed in Table IV. Note that in most cases $p_{max}$ is close to $h_3 = 2$, but may deviate, especially for large bundling values. Using this approach, all (nearly) balanced networks for a given value of $h_3$ can be enumerated.

Using the foregoing approximation for the bristling factor, the number of ports per processing (end) node in the balanced two-tier case can be expressed as:

$$\frac{r}{p} = \frac{p + h_1 + h_2}{p} = \begin{cases} 1 + \dfrac{3\frac{h_2}{b_2} - 1}{\frac{h_2}{b_2} - \frac{1}{2}} & \text{for } b_2 \le \dfrac{2h_2}{3} \\ 3\dfrac{h_2}{b_2} & \text{for } b_2 > \dfrac{2h_2}{3} \end{cases}$$

for $b_2 \le h_1 + 1$.
The number of routers per end node equals $1/p$; hence $$\frac{1}{p} = \begin{cases} \dfrac{1}{h_2 - \frac{b_2}{2}} & \text{for } b_2 \le \dfrac{2h_2}{3} \\ \dfrac{1}{b_2} & \text{for } b_2 > \dfrac{2h_2}{3} \end{cases}$$

The deadlock avoidance policy as described above for GDF is also valid for XGDF topologies. Only in the extreme case of full bundling at all tiers, minimal dimension-order routing requires just a single virtual channel, because each dimension is visited only once.

A good system balance is key to achieving sustained exaflop performance. Providing sufficient communication bandwidth will be critical to enabling a wide range of workloads to benefit from exascale performance. With current HPC interconnect technology, the byte-to-FLOP ratio will likely be orders of magnitude less than in current petascale systems, which would pose significant barriers to performance portability for many, particularly for communication-intensive, workloads. For reasons of cost and density, integrated routers are preferred towards achieving acceptable byte/FLOP ratios. Based on IO pin and power arguments, the prior art two-tier dragonfly is not amenable for an integrated exascale network. Although three-tier networks actually increase the overall number of links and their associated power, the fact that a drastically lower router radix is sufficient to scale to million-node networks (radix 20 vs. radix 90 for two tiers) enables low-radix routers that are amenable to integration on the main compute node, because they require modest link IO power and pin budgets.

Referring now to FIG. 10, there is depicted a block diagram of an exemplary processing unit 1000 that, in accordance with a preferred embodiment, includes at least one integrated router. In the depicted embodiment, processing node 1000 is a single integrated circuit comprising a semiconductor or insulator substrate on which integrated circuitry is formed. Processing node 1000 includes two or more processor cores 1002a, 1002b for processing instructions and data. In some embodiments, each processor core 1002 is capable of independently executing multiple simultaneous hardware threads of execution.

The operation of each processor core 1002 is supported by a multi-level volatile memory hierarchy having at its lowest level a shared system memory 1004 accessed via an integrated memory controller 1006, and at its upper levels, one or more levels of cache memory, which in the illustrative embodiment include a store-through level one (L1) cache within and private to each processor core 1002, a respective store-in level two (L2) cache 1008a, 1008b for each processor core 1002a, 1002b. Although the illustrated cache hierarchy includes only two levels of cache, those skilled in the art will appreciate that alternative embodiments may include additional levels (L3, etc.) of on-chip or off-chip, private or shared, in-line or lookaside cache, which may be fully inclusive, partially inclusive, or non-inclusive of the contents the upper levels of cache.

Processing node 1000 further includes an I/O (input/output) controller 1010 supporting the attachment of one or more I/O devices (not depicted). Processing node 1000 additionally includes a local interconnect 1012 supporting local communication among the components integrated within processing node 1000, as well as one or more integrated routers 1016 that support communication with other processing nodes 1000 or other external resources via an interconnection network having a GDF or XGDF topology as previously described. As shown, a router 1016 includes a plurality of ports 1018 and a controller 1020 that controls transfer of packets between ports 1018 and between router 1016 and local interconnect 1012 according to one or more routing policies, as previously described. Router 1016 may optionally further include one or more data structures referenced by controller 1020 in the course of making routing determinations, such as forwarding database (FDB) 1022 and routing database (RDB) 1024.

In operation, when a hardware thread under execution by a processor core 1002 of a processing node 1000 includes a memory access (e.g., load or store) instruction requesting a specified memory access operation to be performed, processor core 1002 executes the memory access instruction to determine the target address (e.g., an effective address) of the memory access request. After translation of the target address to a real address, the cache hierarchy is accessed utilizing the target address. Assuming the indicated memory access cannot be satisfied by the cache memory or system memory 1004 of the processing node 1000, router 1016 of processing node 1000 may transmit the memory access request to one or more other processing nodes 1000 of a multi-node data processing system (such as those shown in FIG. 2 or FIG. 7) for servicing. The one or more other processing nodes 1000 may respond to the memory access request by transmitting one or more data packets to the requesting processing node 1000 via the interconnection network.

With reference now to FIG. 11, there is depicted a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above and shown herein. The design structures processed and/or generated by design flow 1100 may be encoded on machine-readable transmission or storage media to include data and/or instructions that, when executed or otherwise processed on a data processing system, generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1020 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1110 to simulate or otherwise functionally represent an electronic component, circuit, electronic or logic module, apparatus, device, or system such as those shown herein. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of the components, circuits, devices, or logic structures shown herein to generate a netlist 1180 which may contain design structures such as design structure 1120. Netlist 1180 may comprise, for example, compiled or otherwise processed data structures representing a list of wires, discrete components, logic gates, control circuits, I/O devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1110 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1140, characterization data 1150, verification data 1160, design rules 1170, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1190 may comprise a compiled, executable HDL simulation model that functionally simulates the devices shown herein.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1190 may then proceed to a stage 1195 where, for example, design structure 1190: proceeds to tape-out, is released to manufacturing, is released to a mask house, is sent to another design house, is sent back to the customer, etc.

As has been described, the present disclosure formally generalizes the dragonfly topology to an arbitrary number of tiers, yielding the generalized dragonfly (GDF) topology. These networks are characterized herein in terms of their connectivity pattern, scaling properties, diameter, average distance, cost per node, direct and indirect routing policies, number of virtual channels (VCs) required for deadlock freedom, and a corresponding VC assignment policy. Moreover, specific configurations are disclosed that reflect balance, i.e., configurations that theoretically provide 100% throughput under uniform traffic. Closed-form expressions for the topological parameters of balanced two- and three-tier GDF networks are provided. Moreover, the present disclosure introduces the notion of a balanced router radix and derives closed-form expressions as a function of network size for two- and three-tier networks. The present disclosure also demonstrates that the parameters that provide a balanced network also happen to lead to a maximum-sized network, given a fixed router radix.

In a second generalization, the present disclosure extends the GDF framework to encompass networks with more than one link in between groups, referred to herein as the extended generalized dragonfly (XGDF). This extension appreciates that most practical installations of a given dragonfly network are much smaller than the theoretical maximum size, which could leave many links unused. Rather than leaving such links unused, the XGDF topology employs these links to provide additional bandwidth between groups. To this end, bundling factors that specify the number of links in between groups at each tier are introduced. XGDFs are analyzed in terms of the same criteria as GDFs, again paying special attention to the notion of balance, and quantifying the effect of bundling on network balance. In particular, it has been found that the balance between first and second tier depends linearly on the bundling factor at the second tier, and that the bristling factor exhibits a non-monotonous behavior as a function of the bundling factor.

In at least one embodiment, a multiprocessor computer system includes a plurality of processor nodes and at least a three-tier hierarchical network interconnecting the processor nodes. The hierarchical network includes a plurality of routers interconnected such that each router is connected to a subset of the plurality of processor nodes; the plurality of routers are arranged in a hierarchy of n≥3 tiers $(T_1 \ldots, T_n)$; the plurality of routers are partitioned into disjoint groups at the first tier $T_1$, the groups at tier $T_i$ being partitioned into disjoint groups (of complete $T_i$ groups) at the next tier $T_{i+1}$ and a top tier $T_n$ including a single group containing all of the plurality of routers; and for all tiers 1≤i≤n, each tier-$T_{i-1}$ subgroup within a tier $T_i$ group is connected by at least one link to all other tier-$T_{i-1}$ subgroups within the same tier $T_i$ group.

While various embodiments have been particularly shown and described, it will be understood by those skilled in the art that various changes in form and detail may be made therein without departing from the spirit and scope of the appended claims and these alternate implementations all fall within the scope of the appended claims.

What is claimed is:

1. A multiprocessor computer system comprising:
   a plurality of processor nodes; and
   a multi-tier hierarchical network interconnecting the processor nodes, wherein the multi-tier hierarchical network includes a plurality of routers, wherein:
   each router is connected to a subset of the plurality of processor nodes;
   the plurality of routers are arranged in a hierarchy of n tiers $(T_1, \ldots, T_n)$ where n is at least three;
   the plurality of routers are partitioned into disjoint groups at a first tier $T_1$, groups of routers at each intermediate tier $T_i$ are partitioned into disjoint groups at a next higher tier $T_{i+1}$, and a top tier $T_n$ includes a single group containing all of the plurality of routers;
   for all tiers 1≤i≤n, each tier-$T_{i-1}$ subgroup within a tier $T_i$ group is connected by at least one link to all other tier-$T_{i-1}$ subgroups within a same tier $T_i$ group.

2. The multiprocessor computer system of claim 1, wherein each group of at least one specific tier $T_i$ is connected to each other group within a same tier $T_{i+1}$ group by a plurality of links, such that multiple but less than all $T_{i-1}$ routers from one T group are connected to different $T_{i-1}$ routers in its peer $T_i$ group.

3. The multiprocessor computer system of claim 2, wherein a number of links connecting each pair of $T_i$ subgroups is an integer divisor of the number of routers times the number of tier-i links per router in each $T_i$ subgroup.

4. The multiprocessor computer system of claim 3, wherein:
   bundling factors at tiers $(T_1, \ldots, T_n)$ equal $(b_1, \ldots, b_n)$;
   a number of subgroups that comprise a tier $T_i$ group equals $$G'_i = \frac{\left(\prod_{j=1}^{n-1} G'_j\right) h_i}{b_i} + 1,$$

where
   $h_i$ is a number of peer ports per router for tier $T_i$;
   a total number of routers $S_i'$ that comprise a tier $T_i$ group equals $$S'_i = \prod_{j=1}^{i} G'_j;$$

and
   for all i, bundling factor $b_i$ is an integer divisor of $S_i' \cdot h_i$.

5. The multiprocessor computer system of claim 1, wherein a number of links provided by each router to connect to other groups at respective tiers $(T_1, T_2, \ldots, T_n)$ equals $(h_1, \ldots, h_n)$, such that the number $G_i$ of subgroups that comprise a tier $T_i$ group equals $$G_n = \left(\prod_{j=1}^{n-1} G_j\right) \cdot h_n + 1$$

and a total number $S_i$ of routers that comprise a tier $T_i$ group equals $$S_i = \left(\prod_{j=1}^{i} G_j\right).$$

6. The multiprocessor computer system of claim 1, wherein a ratio between a number of links per router used to connect to groups at respective tiers $(T_1, T_2, \ldots, T_n)$ equals $(2^{n-1}, 2^{n-2}, \ldots, 1)$.

7. The multiprocessor computer system of claim 1, wherein each router provides, for each link corresponding to a connection between subgroups at tier $T_i$, at least $2^{n-i}$ distinct virtual channels for deadlock-free shortest-path routing, for 1≤i≤n.

8. The multiprocessor computer system of claim 7, wherein routers perform a virtual channel mapping of traffic arriving on an incoming virtual channel number $vc_x$ of a link corresponding to tier $T_x$ to a link corresponding to outgoing tier $T_y$ to an outgoing virtual channel number $vc_y$ depending on index x, index y, and the incoming virtual channel number $vc_x$ according to:

$$vc_y = \lfloor vc_x / 2^\lambda \rfloor, \ y > x$$
$$= vc_x \cdot 2^\lambda + 2^{\lambda+1}, \ y < x.$$

where $\lambda = |x-y|$ equals an absolute difference between incoming and outgoing tier indices.

9. The multiprocessor computer system of claim 1, wherein each router provides, for each link corresponding to a connection between subgroups at tier $T_i$, at least $2^{n-i}+2^{n-i-1}$ distinct virtual channels for deadlock-free indirect routing, for $1 \leq i < n$ and at least two distinct virtual channels for tier $T_n$.

10. The multiprocessor computer system of claim 1, wherein at least one of the plurality of routers is integrated with one of the plurality of processing nodes.

* * * * *